US007106876B2

(12) United States Patent
Santiago

(10) Patent No.: US 7,106,876 B2
(45) Date of Patent: Sep. 12, 2006

(54) MICROPHONE FOR SIMULTANEOUS NOISE SENSING AND SPEECH PICKUP

(75) Inventor: Richard J. Santiago, Racine, WI (US)

(73) Assignee: Shure Incorporated, Niles, IL (US)

( * ) Notice: Subject to any disclaimer, the term of this patent is extended or adjusted under 35 U.S.C. 154(b) by 19 days.

(21) Appl. No.: 10/684,615

(22) Filed: Oct. 14, 2003

(65) Prior Publication Data

US 2004/0076305 A1 Apr. 22, 2004

Related U.S. Application Data

(60) Provisional application No. 60/418,419, filed on Oct. 15, 2002.

(51) Int. Cl.
*H04R 9/08* (2006.01)
*H04M 1/00* (2006.01)
*H04M 9/00* (2006.01)

(52) U.S. Cl. ............. 381/369; 379/433.03; 379/420.03

(58) Field of Classification Search ........... 379/433.03, 379/420.03; 381/71.7, 71.4, 91, 92, 122, 381/355, 361; 455/575.1
See application file for complete search history.

(56) References Cited

U.S. PATENT DOCUMENTS

| | | | | |
|---|---|---|---|---|
| 4,173,748 | A | 11/1979 | Lewandowski | |
| 4,489,442 | A | 12/1984 | Anderson et al. | |
| 5,144,656 | A * | 9/1992 | Oku | 379/433.03 |
| 5,615,270 | A | 3/1997 | Miller et al. | |
| 5,692,059 | A | 11/1997 | Kruger | |
| 6,061,456 | A * | 5/2000 | Andrea et al. | 381/71.7 |
| 6,122,389 | A | 9/2000 | Grosz | |
| 6,529,605 | B1 | 3/2003 | Christoph | |
| 6,560,344 | B1 | 5/2003 | Julstrom et al. | |

FOREIGN PATENT DOCUMENTS

| | | |
|---|---|---|
| JP | 7064591 | 7/1995 |
| WO | WO 01/95666 | 12/2001 |

* cited by examiner

*Primary Examiner*—William J. Deane, Jr.
(74) *Attorney, Agent, or Firm*—Banner & Witcoff, Ltd.

(57) ABSTRACT

The invention provides a microphone for the simultaneous pickup of both ambient background noise and speech in vehicles such as automobiles, aircraft, and marine vessels. The apparatus provides a plurality of cartridges that simultaneously exhibit frequency and polar response characteristics tailored to noise and speech, respectively. In an embodiment of the invention, a single housing contains both a directional microphone and an omni-directional microphone for use in an automobile. In an alternative embodiment, a microphone array having both directional and omni-directional outputs are derived from microphones contained in a single enclosure.

24 Claims, 8 Drawing Sheets

FIG.1
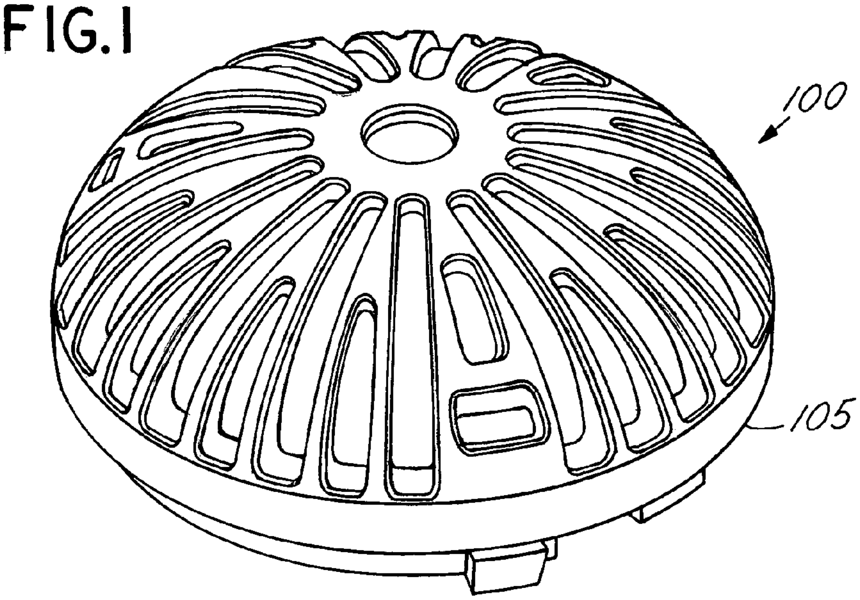
FIG.2A
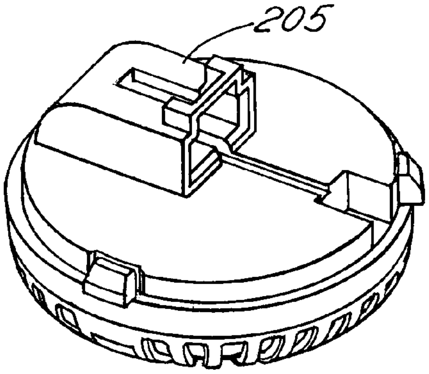
FIG.2B
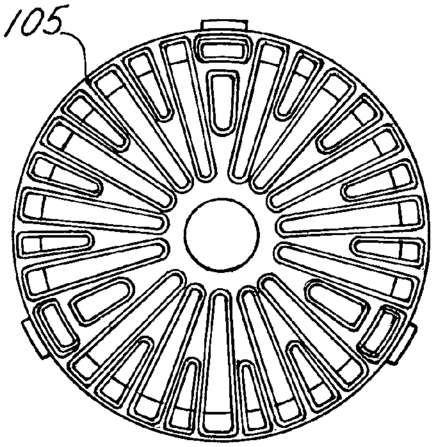
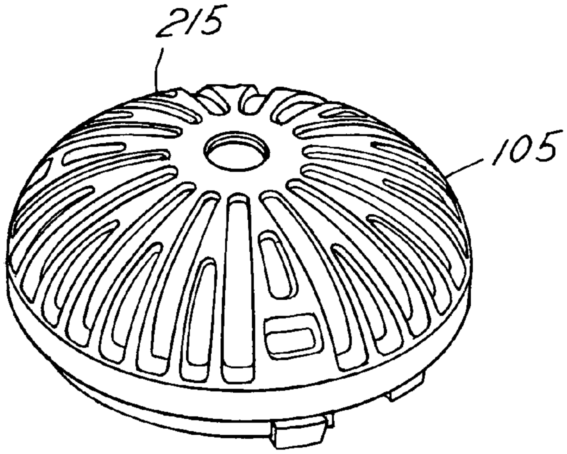
FIG.2C

MICROPHONE FOR SIMULTANEOUS NOISE SENSING AND SPEECH PICKUP

This application claims the benefit of U.S. Provisional Application No. 60/418,419, filed on Oct. 15, 2002.

FIELD OF THE INVENTION

The invention relates to microphones, and more particularly to microphones capable of simultaneous omni-directional and directional characteristics via multiple microphone cartridges located in a single housing.

BACKGROUND OF THE INVENTION

In modern vehicles such as automobiles, aircraft, and marine vessels multiple and different types of microphones are utilized for different applications. For example, in automobiles directional microphones are used in speech recognition applications such as hands-free cellular telephone communications or voice activated instrument control. For these high quality in-vehicle speech applications, the most common microphone is the directional (first order gradient) microphone. Directional microphones that have polar response shapes such as cardioid, if oriented with their maximum response axis oriented towards the talker, do a good job of providing speech pickup while rejecting noise arriving from sources located away from the talker. Further rejection of low-frequency noise is achieved by a microphone high-pass frequency response characteristic which rolls-off sharply below the speech frequency range. In noisy environments, such as automobiles, this rejection of environmental noise results in increased signal-to-noise ratio which yields improved communication sound quality and better speech recognition scores as compared to a signal provided by a similarly located omni-directional microphone.

Additionally, and in contrast to the above requirements for high-quality in-vehicle speech microphones are the requirements for microphones intended to provide signals corresponding to the ambient noise in a vehicle. These in-vehicle microphones are typically used to provide an input signal to a system intended to reduce vehicle interior noise and/or to compensate loudspeaker volume in accordance with fluctuations in vehicle interior noise. In the latter application, these microphones are used to help create an apparently uniform loudspeaker level which tracks ambient noise level fluctuations and eliminates the need for manual loudspeaker volume adjustments by the listener. To facilitate good ambient noise pickup, unlike speech microphones, microphones in this application should have an omni-directional characteristic as well as flat frequency response extending to low frequencies, below the speech range.

Due to the conflicting requirements with respect to microphone directionality and frequency response, one microphone cartridge cannot adequately be employed for both speech recognition and ambient noise detection. The current state of the art is to use two physically separate microphones, each optimized for its intended use. However, this practice is clearly an expensive alternative.

Thus, it would be an advancement in the art to provide a single apparatus that simultaneously supports both high quality speech applications such as hands-free cellular phone communication and ambient noise sensing. Furthermore, it is desired that the apparatus be cost effective, and contained in a housing that is similar in size to an existing single cartridge microphone enclosure.

SUMMARY OF THE INVENTION

The inventive apparatus of this invention overcomes the problems of the prior art by utilizing a dual cartridge microphone contained in a single housing for simultaneous speech pickup and ambient noise sensing. In an embodiment of the invention, the dual cartridge microphone comprises an omni-directional microphone cartridge and a directional microphone cartridge having a cardioid characteristic. The housing for the dual cartridge microphone is similar in size to existing single cartridge microphone housings so that the present invention may use existing microphone mounting holes found in vehicles such as automobiles, aircraft, and marine vessels.

In another embodiment of the invention, back-to-back directional microphone cartridges may be employed within a single housing to derive an omni-directional pattern via electrical summing of the two directional microphone signals, thus providing both a directional pattern suitable for speech and a combined omni-directional pattern suitable for ambient noise sensing.

In yet another embodiment of the invention, a bi-directional microphone element may be employed along with an omni-directional microphone element within a single housing to derive an cardioid speech pattern via electrical summing of the bi-directional microphone element with the omni-directional microphone element, thus providing both a combined directional pattern suitable for speech and an omni-directional pattern suitable for ambient noise sensing.

In a further embodiment of the invention, an array microphone is employed to simultaneously generate dual outputs wherein the outputs of the array microphone comprise characteristics of both an omni-directional microphone and a directional microphone contained in a single housing. The size of the array microphone housing may be no larger than a typical single-output characteristic type array.

These and other advantages and features of the invention will become apparent upon reading the following detailed description and referring to the accompanying drawings in which like numbers refer to like parts throughout.

BRIEF DESCRIPTION OF THE DRAWINGS

FIG. 1 shows the dual cartridge microphone according to an embodiment of the present invention;

FIG. 2A shows the bottom view of the dual cartridge microphone according to an embodiment of the present invention;

FIGS. 2B and 2C show top views of the dual cartridge microphone according to an embodiment of the present invention;

DETAILED DESCRIPTION OF THE INVENTION

The present invention will be illustrated for use in an automobile, but those skilled in the art will realize that the dual cartridge microphone invention of the present invention can be used in other vehicles such as aircraft, and marine vessels. Additionally, the invention may be used in other environments such as in factories, office environments and homes for acoustical applications such as audio conferencing, speakerphones, and surveillance systems.

FIG. 1 shows a dual cartridge microphone 100 for simultaneous speech pickup and ambient noise sensing in accordance with the present invention. Referring to FIG. 1, the dual cartridge microphone 100 is housed in a housing 105 that allows for overhead mounting or rear view mirror mounting in an automobile. Rear view mirror mounting of housing 105 still enables an occupant of the automobile to view objects through the rear view mirror. The present invention may utilize other locations in an automobile for the mounting of housing 105 including a steering wheel, an instrument panel, or an overhead console. Furthermore, the housing 105 may be capable of being mounted in existing mounting holes for microphone devices that contain only a single cartridge.

In an alternate embodiment of housing 105, the dual cartridge microphone 100 may be flush mounted. A detailed description regarding a housing design for a flush mounted directional microphone is described in U.S. Pat. No. 6,122, 389, issued on Sep. 19, 2000, the entire disclosure of which is incorporated by reference.

The dual cartridge microphone housing 105 is constructed to allow sound waves to readily pass through microphone housing 105 and reach the dual cartridges or dual elements (not shown in FIG. 1). The housing 105 may be made of material such as plastic, metal, or other automotive grade material.

Figure 2D:
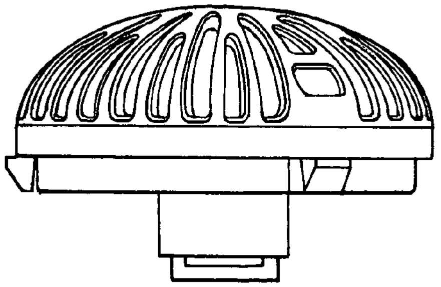
FIGS. 2D, 2E, and 2F show various side views of the dual cartridge microphone according to an embodiment of the present invention.
Figure 2E:
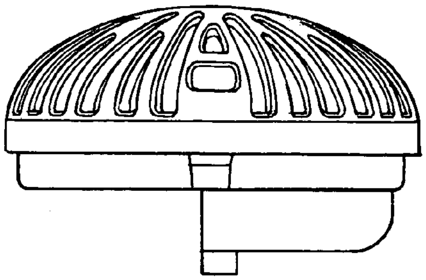
Figure 2F:
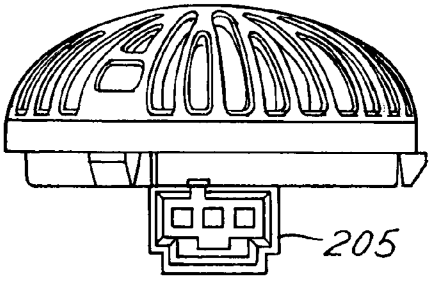
Figure 2G:
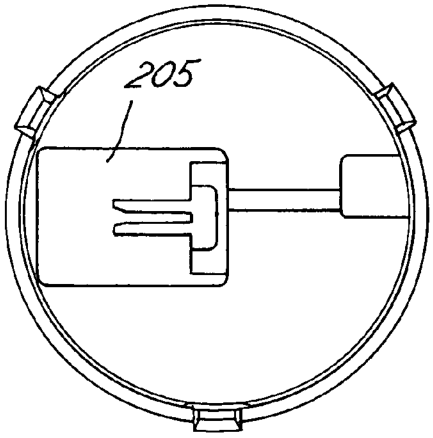
FIG. 2G shows a bottom view of the dual cartridge microphone according to an embodiment of the present invention.

FIGS. 2A through 2G show various views of the dual cartridge microphone 100. In particular, FIGS. 2A and 2G show bottom views of the dual cartridge microphone 100. The bottom of the dual cartridge microphone 100 contains a socket 205 for connection to a microphone/communication cable (not shown). The microphone/communication cable is connected to socket 205 for the delivery of the electrical signals generated by each of the dual cartridges and for providing power to the preamplifier circuit as illustrated in the block diagram of FIG. 7. Socket 205 allows printed circuit board 325 (FIG. 3) to be soldered to socket 205 without the use of an internal wire harness. Additionally, socket 205 allows users to connect to an external wire harness. In an alternate embodiment, a wire harness is permanently attached to housing 105 and socket 205 is omitted.

FIGS. 2B and 2C show top views of the dual cartridge microphone 100 while FIGS. 2D, 2E, and 2F show various side views of the dual cartridge microphone 100 in accordance with an embodiment of the present invention. FIG. 2F shows the connection points of socket 205 for connection to a microphone/communication cable.

Figure 3:
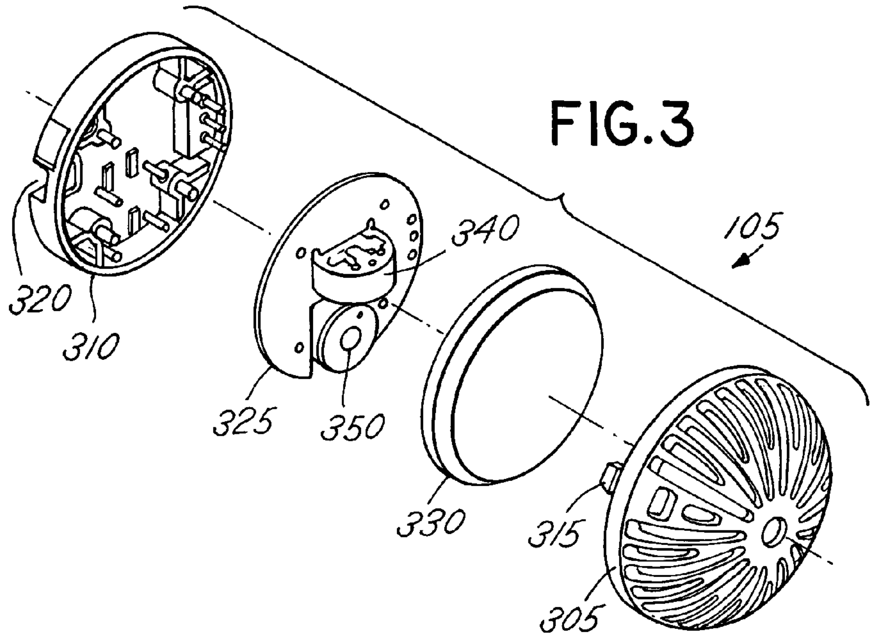
FIG. 3 shows the grille, base and internals of the dual cartridge microphone according to an embodiment of the present invention.

Referring to FIG. 3, the housing 105 of the dual cartridge microphone 100 includes a grille portion 305 and a base portion 310. The grille portion 305 is constructed to allow open-air flow to the dual cartridges. Additionally, the grille 305 does not significantly interfere with the dual cartridges' frequency response characteristics. The grille portion 305 contains a tab 315 for securing the grille portion 305 to the base portion 310. The base portion 310 includes a slot 320 for acceptance of the tab 315. FIG. 3 also shows the internals of the dual cartridge microphone 100. The internals of the dual cartridge microphone 100 consists of the printed circuit board 325, and a windscreen 330.

The windscreen 330 may consist of a piece of open-cell polyurethane foam. The windscreen 330 functions to sharply reduce wind and air gust noises. To have these desirable acoustical properties, the windscreen 330 may have relatively low acoustical impedance, with porosity in the range of 40% to 100 ppi (pores per square inch). In one embodiment, an 80 ppi windscreen as supplied by Foam Molders and Specialties, Inc. p/n F1002-002 may be used. The windscreen 330 is placed directly under the grille portion 305 and directly on top of the printed circuit board 325. Additionally, the windscreen 330 provides mechanical vibration damping for the directional microphone cartridge 340.

The printed circuit board 325 contains dual cartridges 340 and 350. In a preferred embodiment, cartridge 340 is a transducer in the form of a directional microphone cartridge. The directional microphone cartridge 340 may be of the condenser type. The directional microphone cartridge 340 offers discrimination against background noise and undesired acoustic signals. In an embodiment, the directional microphone cartridge 340 is optimized for high-quality speech pickup, with a cardioid polar pattern. Gradient microphones having alternate polar patterns may also be utilized. In the preamplifier circuit of FIG. 8, a high-pass filter 820 is employed to decrease pickup of low-frequency background noise and increase speech intelligibility.

Similarly, in a preferred embodiment cartridge 350 contains a transducer in the form of an omni-directional microphone cartridge. The omni-directional microphone cartridge 350 may be of the condenser type. The omni-directional microphone cartridge 350 is designed for ambient noise pickup, with an omni-directional polar pattern and extended low frequency response to provide accurate noise sampling.

Directional microphone cartridge 340 and omni-directional microphone cartridge 350 each have separate outputs for speech pickup and ambient noise sensing applications, respectively. The directional microphone cartridge output may be used for applications that include hands-free cellular telephone communications or voice activated instrument control. The omni-directional microphone output may be used for automatic loudspeaker volume compensation and/ or active noise control. For example, see U.S. Pat. No. 5,615,270 issued on Mar. 25, 1997, and U.S. Pat. No. 6,529,605 issued on Mar. 4, 2003, the entire disclosures of both are hereby incorporated by reference. Additionally, the outputs of a the dual cartridge microphone can be used in algorithms for applications that automatically gate "on" and "off" a microphone in response to a speaker's voice being received from a particular direction of sound arrival relative to the microphone. One such algorithm is described by U.S. Pat. No. 4,489,442 issued on Dec. 18, 1984, the entire disclosure of which is incorporated by reference. FIG. 2F illustrates the connection points of each of the separate outputs as shown in socket 205.

Figure 3A:
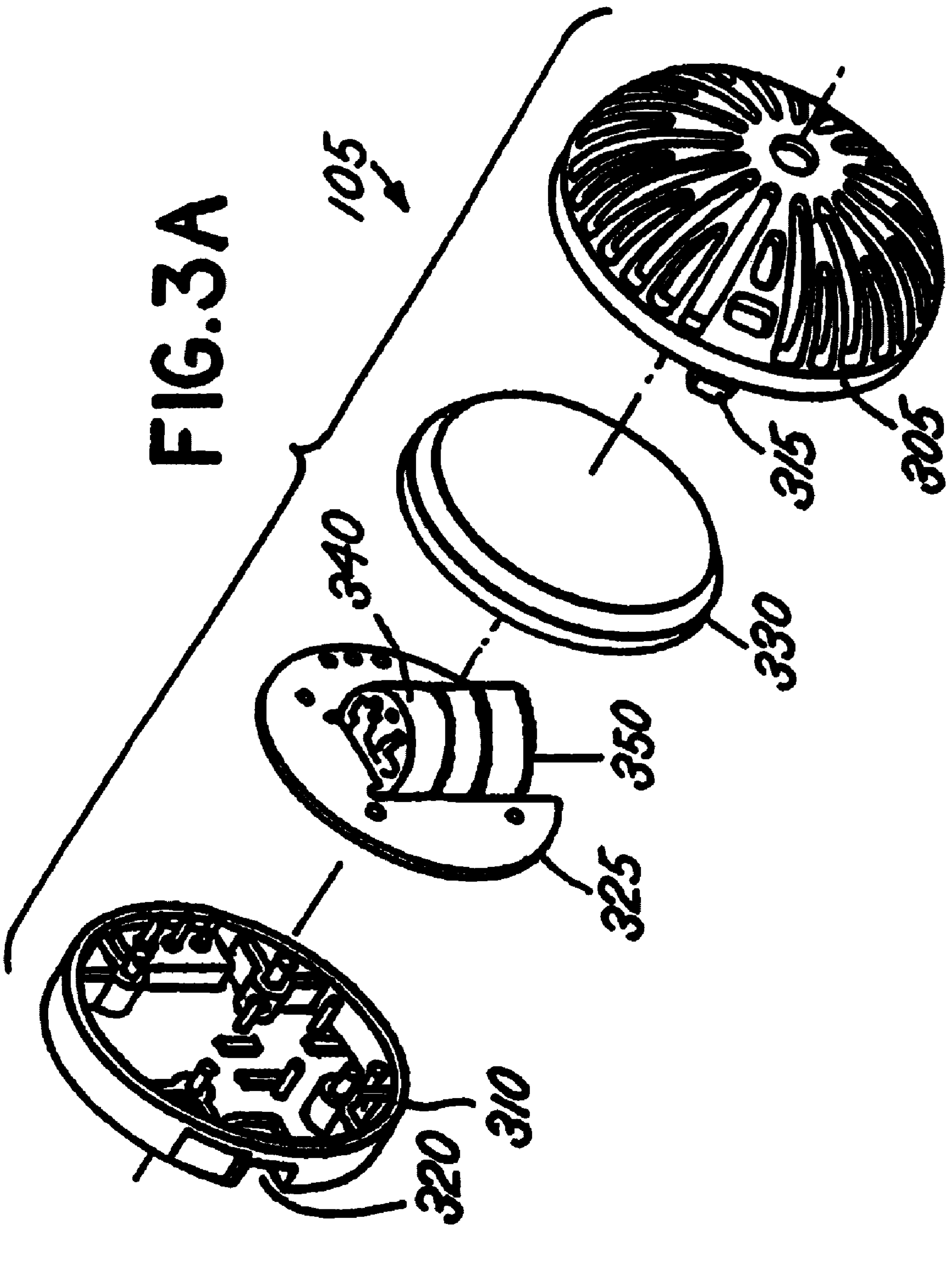
FIG. 3A shows the grille, base and internals of the dual cartridge microphone according to another embodiment of the present invention having two directional microphones positioned back to back.

In another embodiment shown in FIG. 3A, back-to-back directional microphone cartridges 340, 350 having cardioid pickup patterns may be employed within a single housing to derive an omni-directional pattern via electrical summing of the two directional cartridge output signals. This can provide both a directional pattern suitable for speech and a combined omni-directional pattern suitable for ambient noise sensing.

Similarly, in another embodiment, a bi-directional microphone cartridge may be employed along with an omni-directional microphone element within a single housing to derive a cardioid pickup pattern via electrical summing of the bi-directional cartridge output signal with the omni-directional cartridge output signal. This configuration may provide both a combined directional pattern suitable for speech and an omni-directional pattern suitable for ambient noise sensing.

Figure 4:
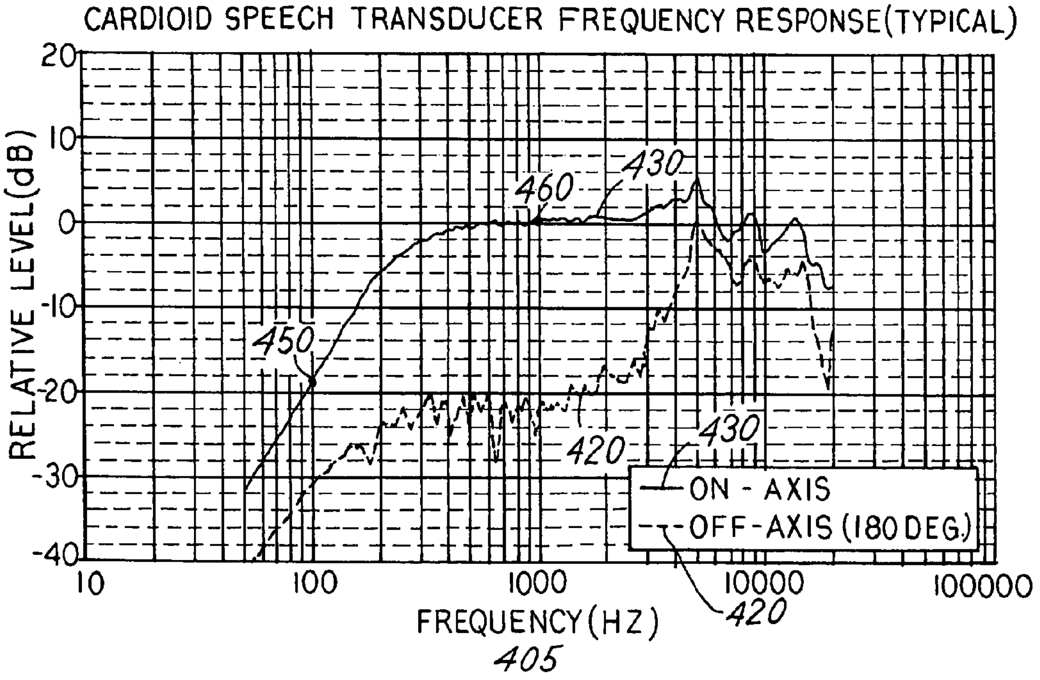
FIG. 4 shows a graphical representation of a typical cardioid speech transducer frequency response according to an embodiment of the current invention.
Figure 5:
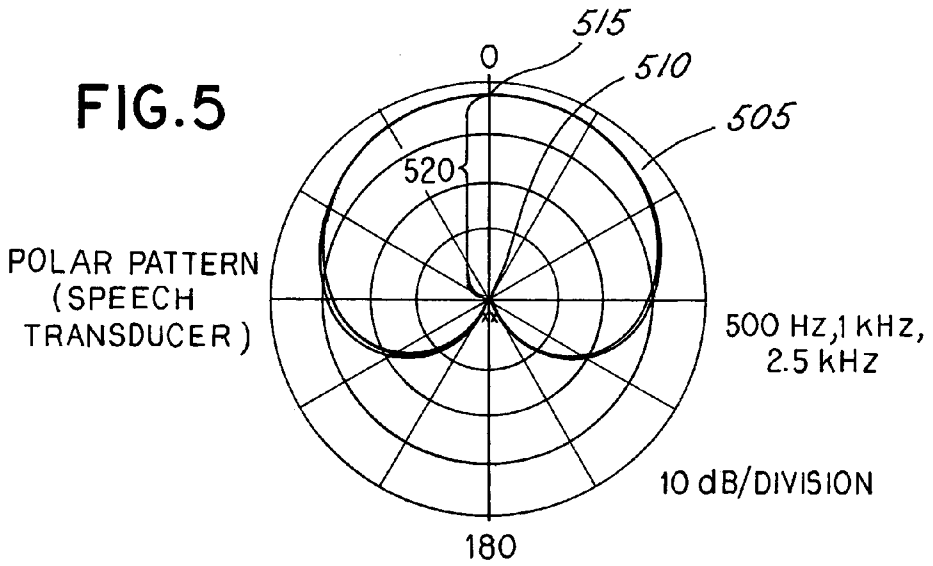
FIG. 5 shows a polar plot of a typical cardioid speech transducer for the current invention.

FIG. 4 and FIG. 5 show a graphical representation of a typical cardioid speech transducer frequency response and polar response, respectively, of a directional microphone 342 with pre-amplification 705 and high-pass filter 720 circuitry used in the preferred embodiment. In FIG. 4, the frequency response in Hertz 405 is graphed for both an acoustic signal that is directly in front of the directional microphone 342, on axis 430, and an acoustic signal that is off axis 420 by 180 degrees. As the graph illustrates, the directional microphone 342 has a low-frequency sensitivity at 100 Hertz, point 450, nearly 20 decibels down relative to the sensitivity at 1000 Hertz, point 460. This reduced frequency sensitivity at lower frequencies is a result of high-pass circuitry 720 which is employed in order to decrease pickup of unwanted low-frequency background noise which may inhibit speech intelligibility.

Referring to FIG. 5, directional microphone 342 receives an acoustic signal in accordance with its directional characteristics. The cardioid curve 505 of FIG. 5 represents the relative sensitivity of directional microphone 342 to acoustic signals originating from various angles in space. The polar plot of FIG. 5 shows frequency responses for 500 Hz, 1000 Hz, and 2500 Hz. As shown, cardioid curve 505 represents the polar plot for frequency responses to 500 Hz, 1000 Hz, and 2500 Hz for directional microphone 342.

In FIG. 5, a fixed level of an acoustic signal originating directly in front, zero degrees, of the directional microphone 342 along its axis will cause, a reference maximum voltage output from the directional microphone 342. The reference voltage is conveniently referred as 0 decibels and is represented by the distance 520 between center point 510 and a point 515. The relative value of the voltage output of the directional microphone 342 due to the same acoustic signal but emanating at an angle to the directional microphone 342 is also plotted as the distance between the center point 510 and a point located on the curve. Therefore, as illustrated by the cardioid pattern of FIG. 5 the relative sensitivity of the directional microphone 342 decreases as the direction of the acoustic signal moves off axis from the front of the directional microphone 342. To provide the highest sensitivity for the desired sound, while attenuating sounds arriving from other angles, the microphone should be oriented in the application such that the polar location of the desired sound source is located along or as close as practical to being located along the maximum-response, or zero degree axis as indicated by point 515.

Figure 6:
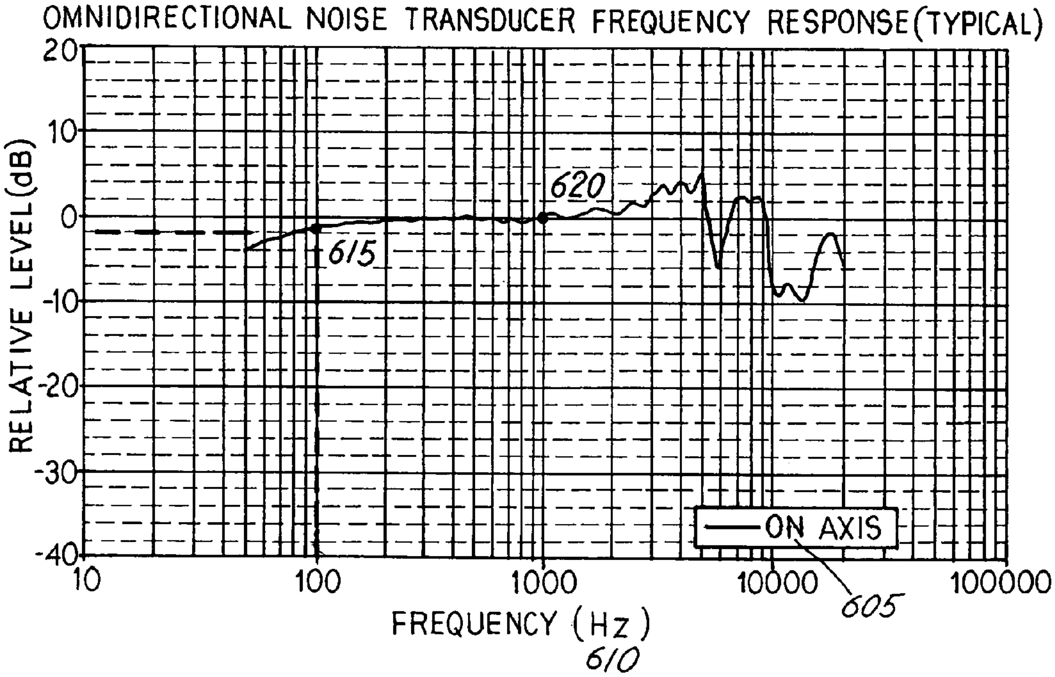
FIG. 6 shows a graphical representation of a typical omni-directional noise transducer frequency response according to an embodiment of the current invention.

In contrast to the directional microphone 342, the omni-directional microphone 352 and associated preamplifier circuitry 710 provides good extended low frequency response for providing accurate noise sampling down to frequencies below the speech range. FIG. 6 shows a graphical representation of a typical omni-directional noise transducer frequency response in Hertz 610 for an acoustic signal that is directly in front of the omni-directional microphone 352, on axis 605, for the current invention. One skilled in the art will recognize from the graph that the omni-directional cartridge and associated circuitry provides uniform frequency response at low frequencies. For example, at 100 Hertz, point 615, the relative decibel level is within 2 dB of the level at 1000 Hertz, point 620. This is a considerably more uniform low-frequency response as compared to that of the directional microphone 342 of FIG. 4.

Figure 7:
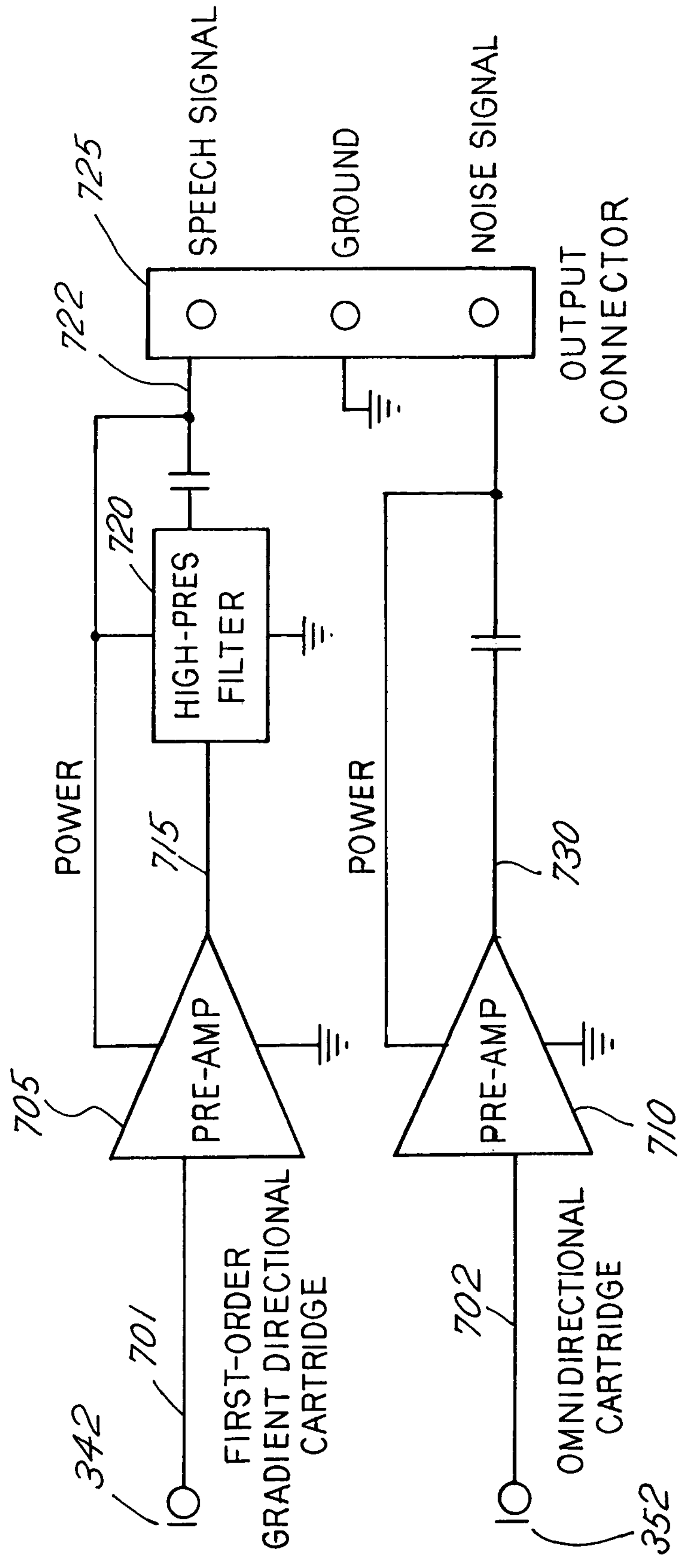
FIG. 7 shows a functional block diagram in accordance with an embodiment of the present invention.

FIG. 7 shows a block diagram in accordance with an embodiment of the present invention. The diagram of FIG. 7 provides that a first electrical signal 701 is generated by directional microphone cartridge 342. A second electrical signal 702 is generated by omni-directional microphone cartridge 352. The electrical signals 701 and 702 are fed into a pair of preamplifiers 705, and 710, respectively. Preamplifier 705 outputs the directional microphone electrical signal 701 in amplified form 715 to a high pass filter 720. The high pass filter 720 removes undesired environmental noise at low frequencies that are not critical to speech signal quality. The output from high pass filter 720 is delivered to the output connector 725 as speech signal 722. Finally, preamplifier 710 outputs the omni-directional microphone electrical signal 702 in amplified form directly to the output connector 725 as noise signal 730. Function blocks such as overvoltage protection, low-pass filtering, RF bypass, microphone bias, and impedance matching are omitted from FIG. 7 to illustrate the key features of the present invention.

Figure 8:
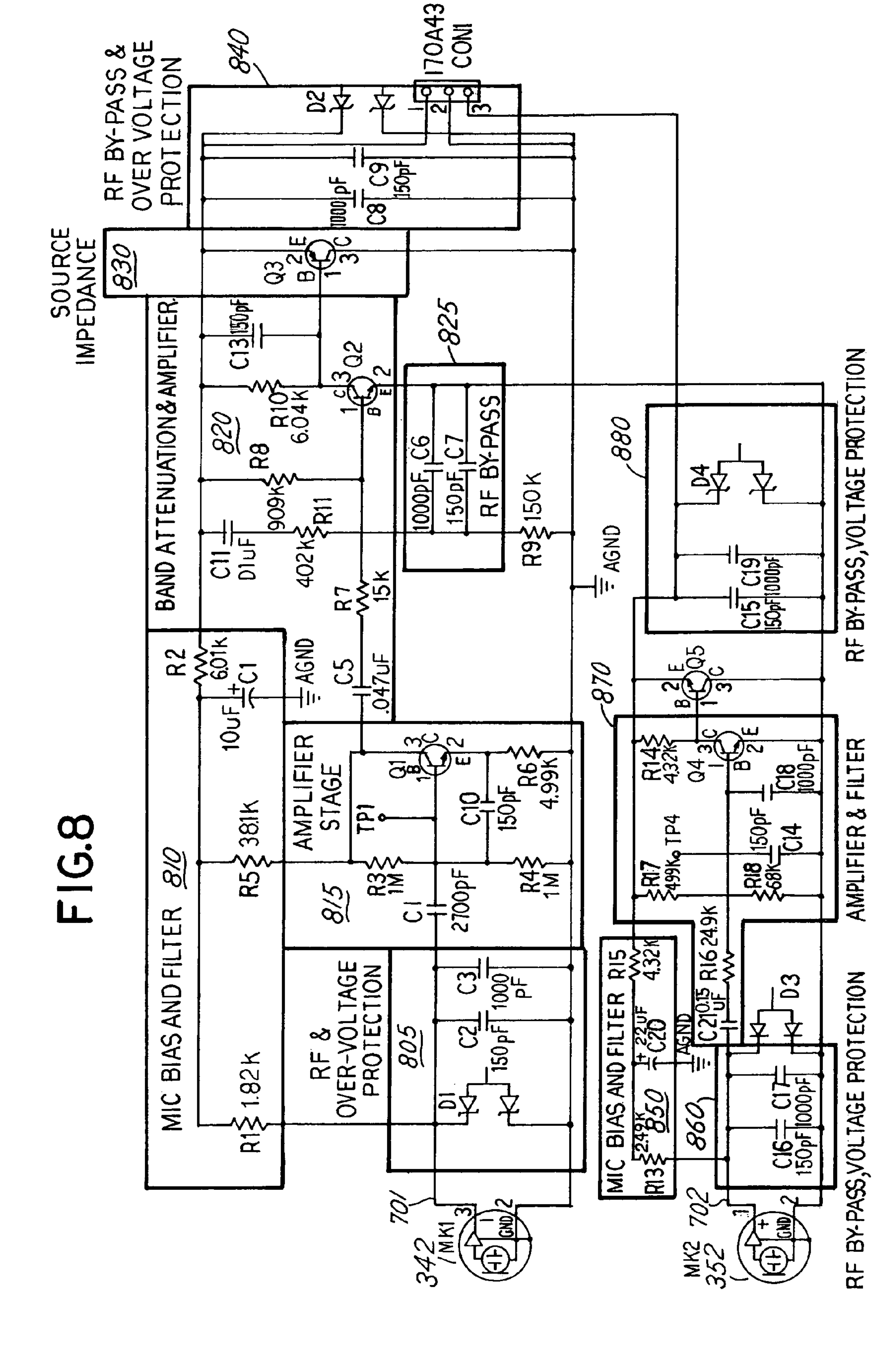
FIG. 8 shows a schematic diagram in accordance with an embodiment of the present invention.

FIG. 8 shows a detailed schematic of the present invention in accordance with the embodiment of FIG. 7. The schematic diagram of FIG. 8 illustrates the different filtering and protection circuits that electrical signals 701 and 702 may encounter. Each of the filtering and protection circuits may be located on printed circuit board 325. For example, electrical signal 701, which is generated by directional microphone cartridge 342 may be subject to RF and over-voltage circuit protection 805, microphone bias and filter circuit 810, amplifier stage 815, band attenuation and amplifier circuit 820, RF bypass circuit 825, source impedance 830, and RF bypass and over-voltage protection 840. Similarly, electrical signal 702, which is generated by omni-directional microphone cartridge 352 may be subject to microphone bias and filter 850, RF bypass and voltage protection 860, amplifier and filter circuit 870, and RF bypass and voltage protection 880.

Figure 9:
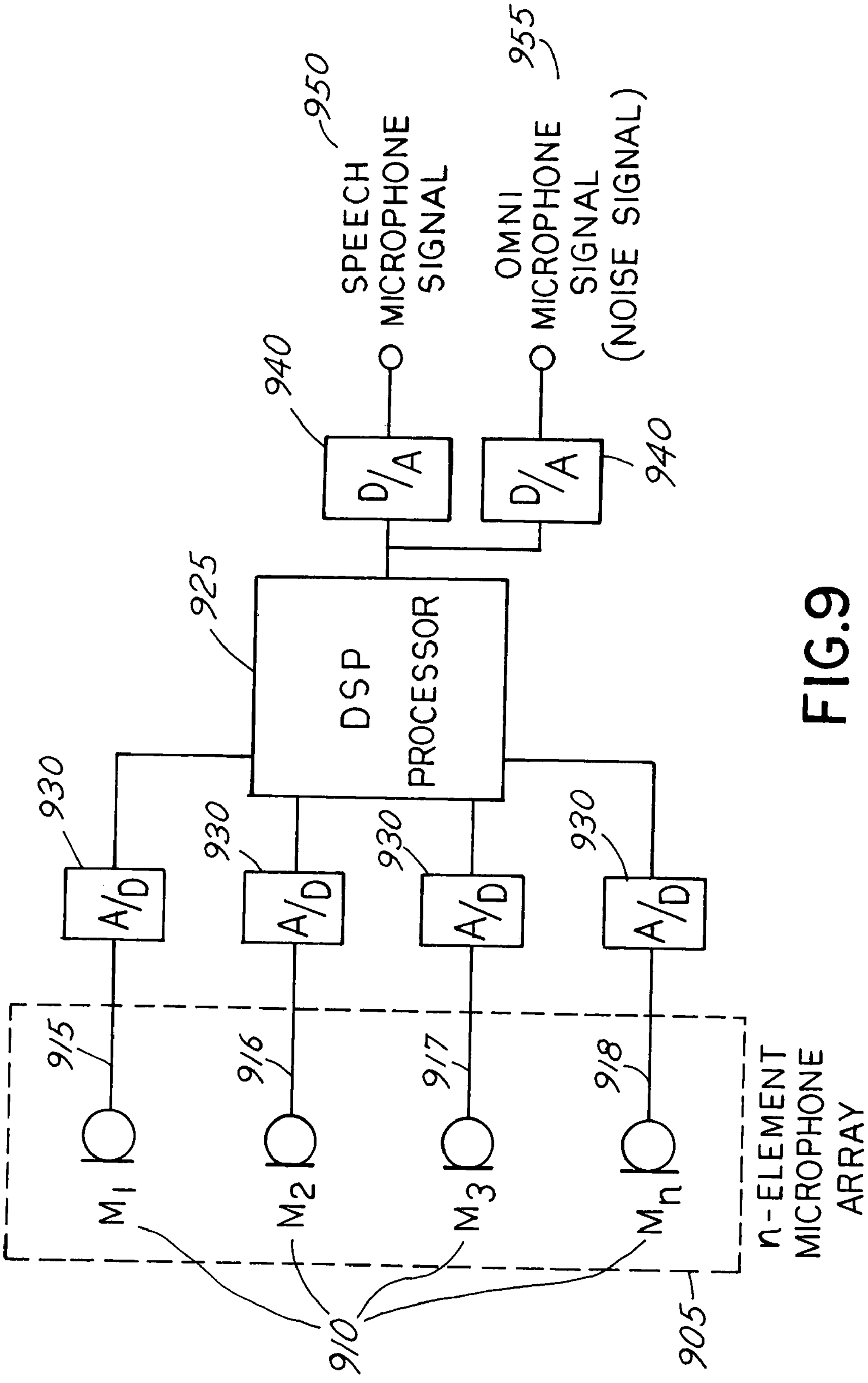
FIG. 9 shows a functional block diagram in accordance with an alternative embodiment of the present invention.

In an alternative embodiment, the dual cartridge microphone may comprise a microphone array as illustrated in FIG. 9. The microphone array 905 may comprise a series of cartridges 910 connected together and housed in single enclosure. The cartridges 910 may have directional or omni-directional characteristics. As one skilled in art will realize, n-number of cartridges $M_1 \ldots M_n$ may have their individual outputs combined through array signal processing to form the microphone array. The number of cartridges may necessarily depend upon the particular application. Additionally, the shape of the enclosure may encompass many different forms depending upon the number of cartridges. The electrical signals 915 through 918 from each of the cartridges 910 may be combined with the use of a digital signal processor 925 after being converted to digital signals through microphone anal log to digital converters 930. The digital signal processor 925 may combine the speech components of the signals from the directional or omni-directional characteristics cartridges 910 to form an amplified speech signal. Similarly, the noise components from the directional or omni-directional cartridges 910 may be separated and combined to form an amplified noise signal.

Finally, through the use of digital to analog converters 940 a speech signal 950 and noise signal 955 may be used by different applications.

The embodiments of the invention, and the invention itself, have been described in such full, clear, concise, and exact terms to enable a person of ordinary skill in the art to make and use the invention. While the invention has been described with respect to specific examples including presently preferred modes of carrying out the invention, those skilled in the art will appreciate that there are numerous variations and permutations of the above-described apparatus that falls within the spirit and scope of the invention.

The invention claimed is:

1. A dual cartridge microphone for use in a vehicle comprising:
- (a) a printed circuit board;
- (b) a directional microphone cartridge contained on the printed circuit board, the directional microphone cartridge generating a first electrical signal,
- (c) a first preamplifier contained on the printed circuit board, the first preamplifier receiving the first electrical signal and generating a speech signal;
- (d) an omni-directional microphone cartridge contained on the printed circuit board, the omni-directional microphone generating a second electrical signal;
- (e) a second preamplifier contained on the printed circuit board, the second preamp ifier receiving the second electrical signal and generating a noise signal;
- (f) a housing mounted within the vehicle, the housing enclosing the printed circuit board the directional microphone cartridge and the omni-directional microphone cartridge; and
- (g) wherein the speech signal is used in a speech pickup application and the noise signal is used for loudspeaker volume compensation.

2. The dual cartridge microphone of claim 1, wherein the printed circuit board comprises a band pass filter.

3. The dual cartridge microphone of claim 1, wherein the housing comprises a grille portion and a base portion.

4. The dual cartridge microphone of claim 3, wherein the base portion includes a wire harness.

5. The dual cartridge microphone of claim 3, wherein the base portion includes a socket for the connection of a microphone/communication cable.

6. The dual cartridge microphone of claim 1, wherein the directional microphone cartridge includes a cardioid polar pattern for speech pickup.

7. The dual cartridge microphone of claim 1, wherein the omni-directional microphone cartridge includes an omni-directional polar pattern for ambient noise sensing.

8. A dual cartridge microphone for detecting speech and ambient noise in a vehicle, the dual cartridge microphone comprising:
- (a) a housing mounted in the vehicle, the housing having a base portion and a grille portion, the grille portion allowing open air flow into the housing;
- (b) a directional microphone cartridge contained within the housing, the direct onal microphone cartridge generating a first electrical signal responsive to detected speech;
- (c) an omni-directional microphone cartridge contained within the housing, to omni-directional microphone cartridge generating a second electrical signal responsive to detected ambient noise; and
- (d) a printed circuit board contained within the housing, the printed circuit board including filtering and protection circuits, the filtering and protection circuits coupled to the first electrical signal to generate a speech signal, and the filtering and protection circuits coupled to the second electrical signal to generate a noise signal, whereby the speech signal and the noise signal are utilized independently.

9. The dual cartridge microphone of claim 8, wherein the base portion includes a socket for the connection of a microphone/communication cable.

10. The dual cartridge microphone of claim 8, wherein the directional microphone cartridge includes a cardioid polar pattern for speech pickup.

11. The dual cartridge microphone of claim 8, wherein the omni-directional microphone cartridge includes an omni-directional polar pattern for ambient noise sensing.

12. The dual cartridge microphone of claim 8, wherein the filtering and protection circuits coupled to the first electrical signal are selected from the group consisting of a RF and over-voltage circuit, a microphone bias and filter circuit, an amplifier stage circuit, a band attenuation and amplifier circuit, a RF bypass circuit, and a RF bypass and over-voltage circuit.

13. The dual cartridge microphone of claim 8, wherein the filtering and protection circuits coupled to the second electrical signal are selected from the group consisting of a microphone bias and filter circuit, an amplifier and filter circuit, and a RF bypass and over-voltage circuit.

14. The dual cartridge microphone of claim 8, wherein the housing further comprises a windscreen.

15. The dual cartridge microphone of claim 8, wherein the base portion includes a wire harness.

16. A dual cartridge microphone for detecting speech and ambient noise in a vehicle, the dual cartridge microphone comprising:
- (a) a housing mounted within the vehicle, the housing having a base portion and a grille portion, the grille portion allowing open air flow into the housing, the housing mounted in the vehicle;
- (b) a directional microphone cartridge contained within the housing, the directional microphone cartridge generating a first electrical signal responsive to detected speech;
- (c) an omni-directional microphone cartridge contained within the housing, the omni-directional microphone cartridge generating a second electrical signal responsive to detected ambient noise; and
- (d) a printed circuit board contained within the housing, the printed circuit board including filtering and protection circuits, the filtering and protection circuits coupled to the first electrical signal to generate a speech signal, and the filtering and protection circuits coupled to the second electrical signal to generate a noise signal, whereby the speech signal and the noise signal are utilized independently.

17. The dual cartridge microphone of claim 16, wherein the vehicle is an automobile.

18. The dual cartridge microphone of claim 17, wherein the housing is mounted to a steering wheel in the automobile.

19. The dual cartridge microphone of claim 17, wherein the housing is mounted to a rear view mirror in the automobile.

20. The dual cartridge microphone of claim 17, wherein the housing is lush mounted in the automobile.

21. The dual cartridge microphone of claim 17, wherein the housing is mounted to an instrument panel in the automobile.

22. The dual cartridge microphone of claim 17, wherein the housing is mounted to an overhead counsel in the automobile.

23. A dual cartridge microphone comprising:

(a) a printed circuit board;

(b) a bi-directional microphone cartridge contained on the printed circuit board, the bi-directional microphone cartridge generating a first signal;

(c) a omni-directional microphone cartridge contained on the printed circuit board, the omni-directional microphone cartridge generating a second signal;

(d) a housing for enclosing the printed circuit board containing the bi-directional microphone cartridge and the omni-directional microphone cartridge; and (e) wherein the first signal is used in a speech pickup application and the second signal is used for loudspeaker volume compensation.

24. The dual cartridge microphone of claim 23, wherein the first signal and second signal are summed to generate a cardioid pickup pattern.

* * * * *